Patented Feb. 21, 1928.

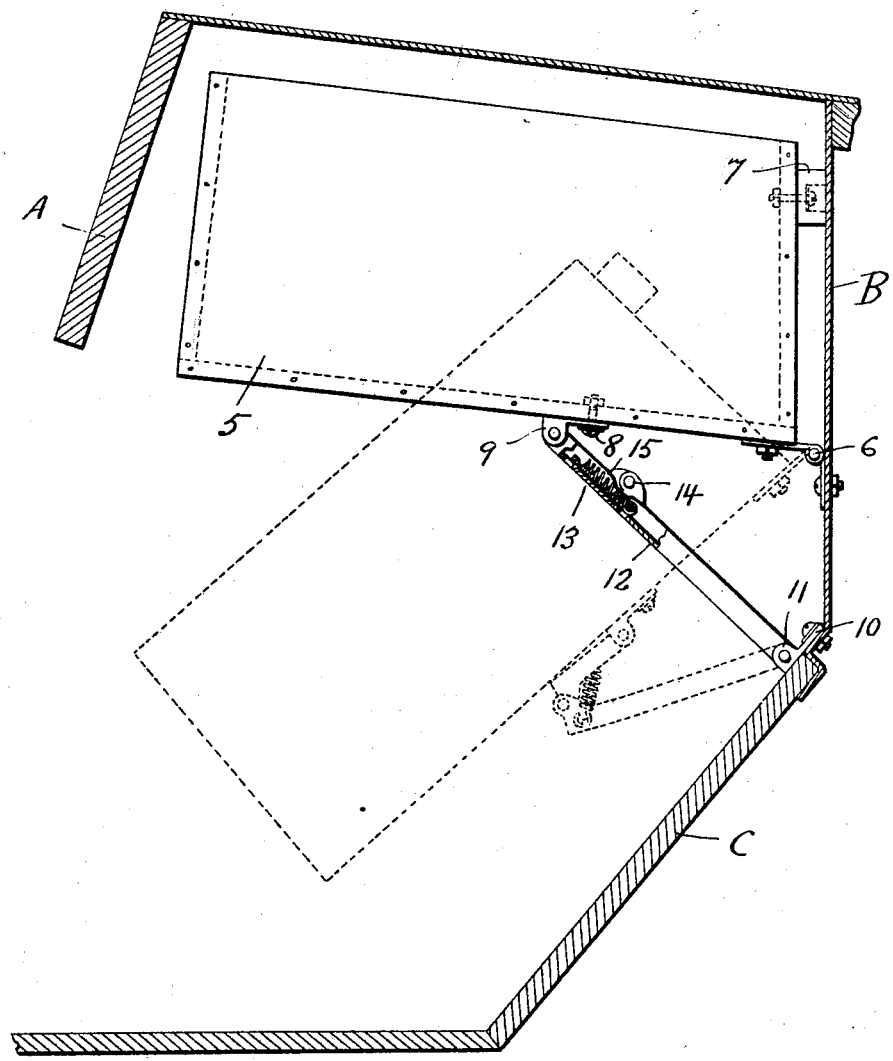

1,659,929

UNITED STATES PATENT OFFICE.

JAMES R. TROUT, OF MARIETTA, OHIO.

TOOL BOX FOR AUTOMOBILES.

Application filed January 14, 1927. Serial No. 161,199.

This invention relates to new and useful improvements in tool boxes for automobiles and has for its primary object to provide in combination a tool receptacle and means whereby the receptacle may be hingedly mounted to the automobile dash board directly in back of the instrument board in such a manner that the box may be swung upwardly so as to be substantially out of view and that may be readily swung downwardly beneath the instrument board to permit of the insertion or removal of tools therefrom.

In the provision of a tool box of this character frequently used tools may be stored therein so that the same will at all times be at hand and overcome the requirement of opening tool chests, raising seats, etc., etc.

The invention further aims to provide a tool box and mounting means therefor that is relatively simple of construction, inexpensive of manufacture and installation and to provide means whereby tools will always be within easy reach of the operator of the automobile.

With the foregoing and other objects in view as the nature of the invention will be better understood, the same comprises the novel form, combination and arrangement of parts hereinafter more fully described, shown in the accompanying drawing and claimed.

In the drawing:—

The figure is a section through an automobile instrument board, dash board and part of the foot board disclosing in side elevation, partly in cross section my improved tool box, disclosed in full line raised position and in dotted line lowered position.

Now having particular reference to the drawing A designates the instrument board of an automobile in forwardly spaced relation with which is the usual dash board B. In carrying out my invention I provide a receptacle 5 of predetermined size and capacity open at its top side and that may be, and preferably is equipped at this open side with a readily removable lid, not shown. The receptacle 5 is suitably hingedly secured at its forward end and at its bottom side as at 6 to the dash board B. The inner end of this receptacle 5 is equipped adjacent its upper end with a rubber bumper 7 to eliminate shock, and also to assist in maintaining the receptacle in spaced relation with said dash board. Anchored to the bottom wall of the said receptacle at a predetermined spaced point from its hinge connection with the dash board B is a bracket 8 equipped at its rear end with a depending ear 9. Rigidly secured to the lower edge of the dash board B directly at its connection with the foot board C is a similar bracket 10 that is also equipped at its inner end with an upwardly projecting ear 11. Pivotally secured to the ears of these brackets are the outer ends of the sections 12 and 13 of an elongated bar hinge, the inner ends of which are pivotally interconnected as at 14, while further connecting the ends of the inner ends of these sections is a retractile coil spring 15 for the purpose of retaining the sections in the full line position and dotted line position shown in the drawing. This particular type of bar hinge together with the brackets 8 and 10 pivoted thereto is a well known and patented device and therefore I make no claim thereto, the same being illustrated merely to disclose a means for supporting the receptacle in the relatively horizontal full line position of the drawing or to permit the same to be swung downwardly as per the dotted lines. However, I do claim as new the provision of a receptacle together with any means whereby this receptacle may be supported in such relatively horizontal position, or wherein the same may be swung downwardly as previously mentioned.

It will thus be seen that I have provided a highly novel, simple, and efficient device of this character that is well adapted for all the purposes heretofore designated, and even though I have herein shown and described the invention as consisting of certain detail structural features it is nevertheless to be understood that some changes may be made therein without affecting the spirit and scope of the appended claims.

Having thus described the invention, what I claim is:—

1. In a tool box structure of the class described, in combination, a dash board, an instrument board located in spaced parallelism with respect to the dash board, a tool box located in the space between the instrument and dash boards, said tool box being open at its top and being of such proportions as to permit it to be concealed from view by the instrument board when not in use, means hingedly connecting the one side of the tool box with the dash board and permitting the opposite side to be swung down in a plane below the instrument board to render the tools accessible, and supporting and retaining means for the tool box for holding it in a position up between the instrument and dash boards or permitting it to be swung down to an inclined position below the instrument board.

2. As a new product of manufacture, an automobile tool box constructed for location in the space between an instrument board and in substantially spaced parallel dash boards located in advance of the instrument board, said tool box being of proportions to permit it to be fitted neatly in said space to render it out of the way and to substantially conceal it, said tool box being open at its top, hinges for connecting one side of the tool box with the dash board, a bumper carried by one side and adapted for cooperation with the dash board, and a sectional supporting and retaining brace device embodying brackets, one of which is adapted for attachment to the bottom of the tool box and the other one of which is adapted for connection to a relatively stationary part of the automobile.

In testimony whereof I affix my signature.

JAMES R. TROUT.